US007988212B2

(12) United States Patent
Hartley et al.

(10) Patent No.: US 7,988,212 B2
(45) Date of Patent: Aug. 2, 2011

(54) VEHICLE MOUNTING AND ALIGNMENT BRACKET

(75) Inventors: Jeffrey Alan Hartley, Howell, MI (US); Paul Schmitt, Ypsilanti, MI (US); John V. Bond, III, Inkster, MI (US); John Wuerth, Novi, MI (US); Michael Czarnecki, Grosse Pointe Woods, MI (US); Joseph Ciaravino, Brownstown, MI (US); John Juronoc, Clinton Township, MI (US); Aaron Mills, Ann Arbor, MI (US); Kurt Peterson, Livonia, MI (US); Paul L. Stanko, Brighton, MI (US); John Wilds, Sr., Troy, MI (US); Harish Dutt, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 553 days.

(21) Appl. No.: 11/626,897

(22) Filed: Jan. 25, 2007

(65) Prior Publication Data

US 2008/0179900 A1    Jul. 31, 2008

(51) Int. Cl.
*B60R 19/48*    (2006.01)
(52) U.S. Cl. ........... 293/117; 293/155; 296/30; 343/713
(58) Field of Classification Search .................. 293/117, 293/155; 180/274; 701/301; 296/187.03, 296/29, 30; 343/713
See application file for complete search history.

(56) References Cited

U.S. PATENT DOCUMENTS

| 5,111,207 | A  | * | 5/1992  | Allen ............................ 342/20 |
| 5,911,395 | A  |   | 6/1999  | Hussaini |
| 6,020,844 | A  |   | 2/2000  | Bai et al. |
| 6,119,067 | A  |   | 9/2000  | Kikuchi |
| 6,157,294 | A  |   | 12/2000 | Urai et al. |
| 6,357,821 | B1 | * | 3/2002  | Maj et al. ................. 296/193.09 |
| 6,386,624 | B1 | * | 5/2002  | Schultz et al. ............. 296/193.1 |
| 6,418,775 | B1 |   | 7/2002  | Sager et al. |
| 6,744,399 | B2 |   | 6/2004  | Tohyama et al. |
| 6,779,765 | B2 |   | 8/2004  | Zheng et al. |
| 6,954,174 | B2 |   | 10/2005 | Isaji et al. |
| 7,148,838 | B2 | * | 12/2006 | Kakishita et al. ............... 342/70 |
| 7,681,700 | B2 | * | 3/2010  | Ginja et al. .................... 188/377 |
| 2003/0184471 | A1 | * | 10/2003 | Tohyama et al. ............. 342/175 |

FOREIGN PATENT DOCUMENTS

JP    7225277 A    8/1995
* cited by examiner

*Primary Examiner* — Glenn Dayoan
*Assistant Examiner* — SunSurraye Westbrook
(74) *Attorney, Agent, or Firm* — Frank A. MacKenzie; Brooks Kushman P.C.

(57) ABSTRACT

A bracket for attaching and aligning a forward-looking radar (FLR) having a front face is disclosed according to one embodiment. The bracket includes a bracket frame having an attachment feature for attaching the FLR to the bracket frame. The bracket also includes a first mounting feature extending from the bracket frame for coupling the bracket face and the first mounting surface of the conveyance to define a first mounting surface angle. The bracket also includes a bracket member extending from the bracket frame. The bracket member includes an end portion disposed proximate to the bracket face and a distal end portion, which includes a second mounting feature for coupling the bracket member and the second mounting surface thereby defining a second mounting surface angle and aligning the FLR front face to an alignment angle.

19 Claims, 3 Drawing Sheets

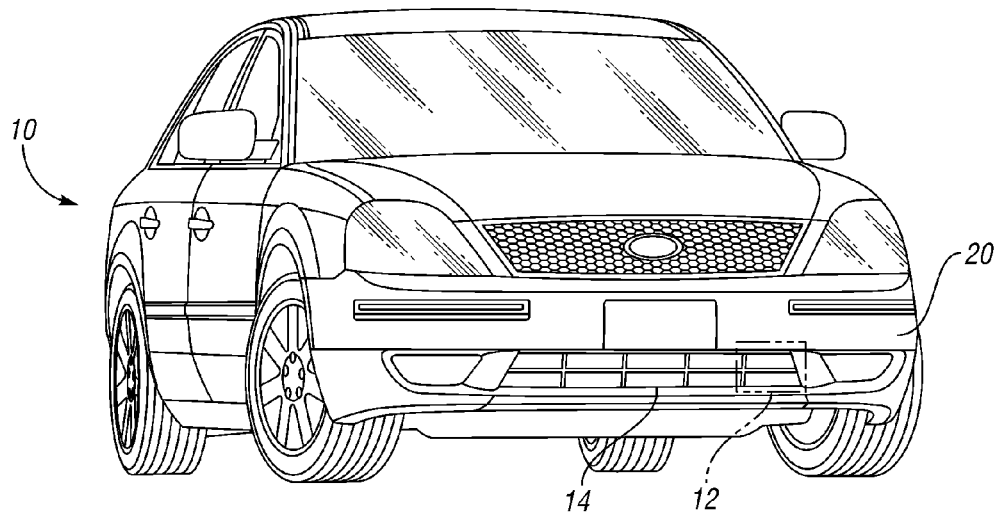
Fig. 1
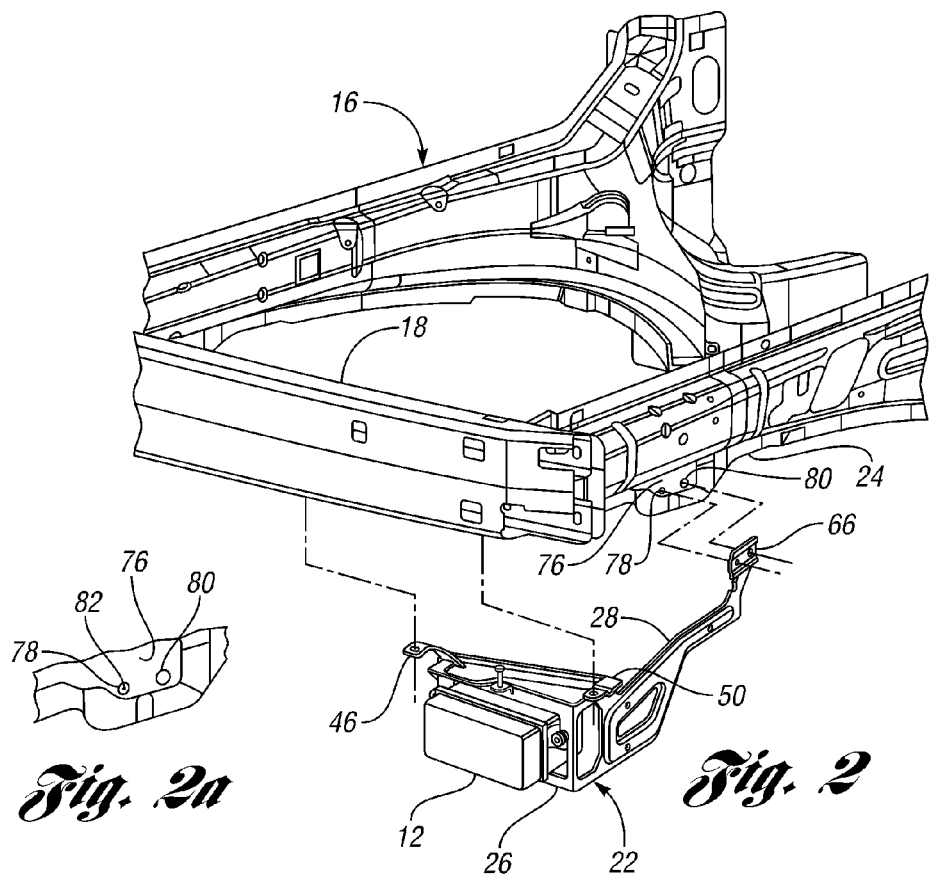
Fig. 2a
Fig. 2

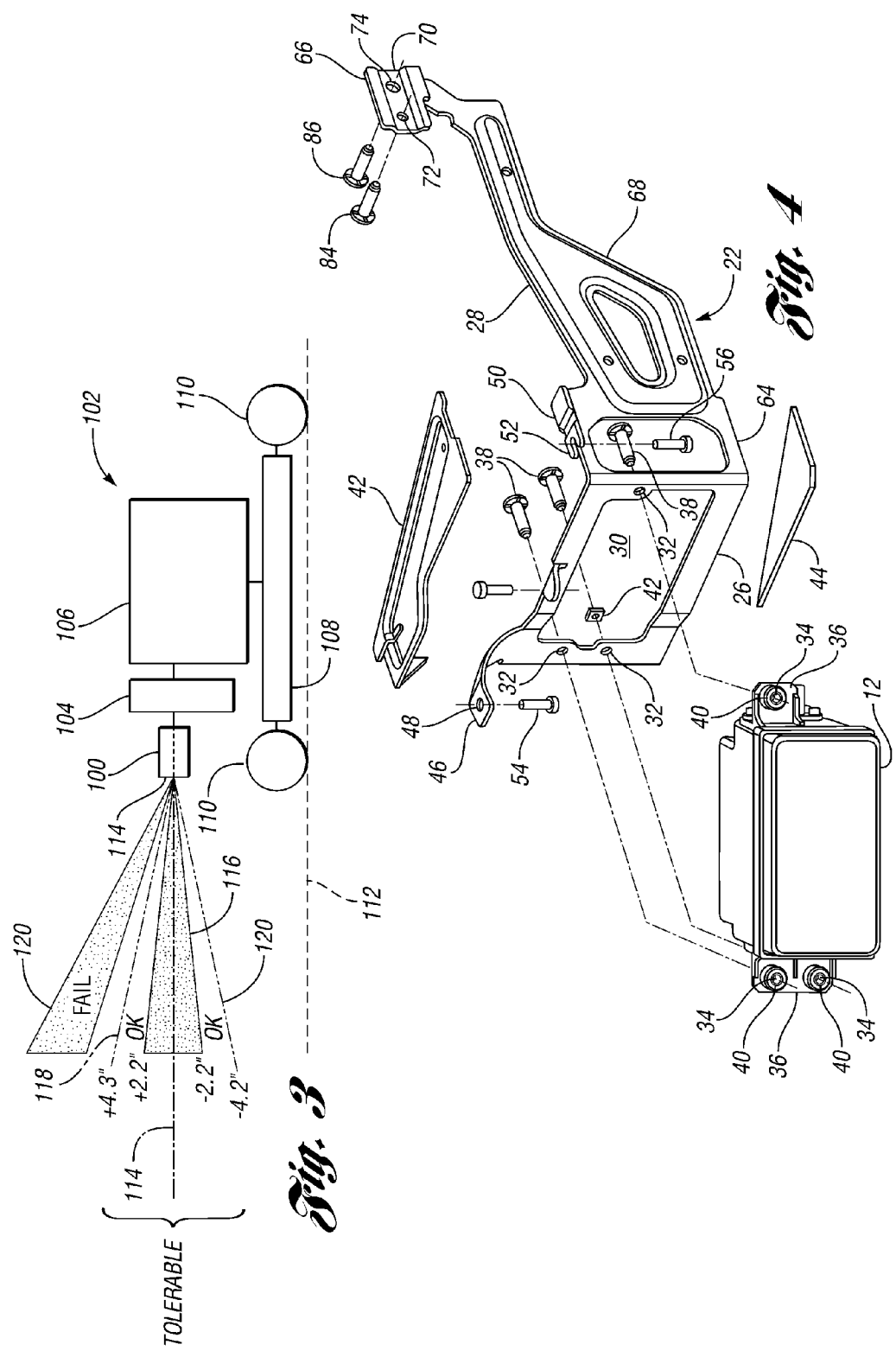

VEHICLE MOUNTING AND ALIGNMENT BRACKET

BACKGROUND

1. Technical Field

One aspect of the present invention generally relates to a vehicle mounting and alignment bracket for use in a radar application.

2. Background Art

Active safety systems for vehicles have been quickly growing in popularity in recent years. These systems typically sense a vehicle's external environment, determine a safety criticality level of current and near future events based on the sensed data, and actuate on-board vehicle systems to react accordingly. According to several proposals, the vehicle's external environment is sensed using a forward looking radar (FLR) unit.

Due to radar power limitations set by the Federal Communications Commission (FCC) and other international governing bodies, a radar is limited to a maximum threshold energy level. Given these limitations, the beam emitted from the FLR unit must be tight and narrow to maximize the range of the beam so that the FLR unit can sense at adequate distances from the vehicle. Therefore, the FLR unit, and hence the radar beam, is typically aligned with a relatively high degree of angular accuracy, such as vertical angular accuracy.

Mounting the FLR unit to a vehicle within the tolerable vertical angular accuracy limits can be challenging because vehicle mounting surfaces used to mount the FLR unit have relatively uncontrolled vertical angular accuracy. For example, the FLR unit can be mounted to the front surface of the vehicle front bumper. During vehicle assembly, the vehicle front bumper is attached to the end of the apron assembly through holes in the apron end and screws connected to the vehicle front bumper. The hole locations can vary significantly between apron ends, for example +/−3.0 millimeters, which may produce a significant variation in the vertical angular alignment of the front bumper mounting surface. If the FLR unit is mounted to this surface, then the use of expensive equipment and time consuming manual adjustment is often necessary to properly vertically align the front face of the FLR unit so that it can be used in active safety systems.

Manual adjustment has many problems. One of the problems is an ergonomics issue. The FLR unit is often located behind a removable fascia panel to minimize styling impact. The FLR unit is adjusted after the fascia panel is installed, thereby making it difficult to manually inspect the FLR unit, and even more difficult to make adjustments to the angular accuracy. These difficulties often translate into "blind" adjustments with poor ergonomic repeatability.

The alignment can be performed at a user-friendly "pit" station with an operator lowered to an appropriate height so that the operator has a clear view of the unit and relatively easy access to the unit. However, this is a relatively costly solution as the typical existing manufacturing facility pits were designed to allow access to the vehicle underside and are typically not long enough to allow access to the area at the front of the vehicle.

Moreover, the alignment process itself is relatively time consuming. One process requires the operator to hold an alignment gauge on the FLR unit, read computer feedback, and turn an adjustment screw in response to the computer feedback. This process requires a high level of attention from the operator until the adjustment is completed, preventing the operator from performing other assembly tasks during alignment.

SUMMARY

In at least one aspect of the present invention, a vehicle mounting and alignment bracket for use in forward looking radar FLR applications is disclosed. In one embodiment, the vehicle mounting bracket can be utilized to align an FLR unit during assembly of the bracket to the vehicle. In at least one embodiment, the assembly alignment step reduces the need for costly and inefficient post bracket assembly corrective manual adjustment.

The above and other objects, features, and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

FIG. 1 is a perspective view of a vehicle including a forward looking radar (FLR) unit mounted onto the vehicle according to one embodiment of the present invention;

FIG. 2 is an exploded, fragmented, perspective view of a vehicle apron assembly and a mounting bracket for mounting an FLR unit onto the vehicle apron assembly according to one embodiment of the present invention;

FIG. 2a is a fragmented, perspective view of a controlled mounting surface according to one embodiment of the present invention;

FIG. 3 is a schematic, cross-sectional, side view illustrating vertical angle tolerances of a FLR unit according to an embodiment of the present invention;

FIG. 4 an exploded view of a mounting bracket and an FLR unit according to an embodiment of the present invention;

DETAILED DESCRIPTION OF EMBODIMENTS

Figure 5:
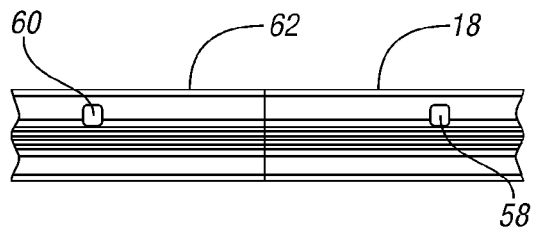
FIG. 5 is a bottom view of the bumper of the vehicle apron assembly depicted in FIG. 2.

As required, detailed embodiments of the present invention are disclosed herein. However, it is to be understood that the disclosed embodiments are merely exemplary of the invention that may be embodied in various and alternative forms. Therefore, specific functional details herein are not to be interpreted as limiting, but merely as a representative basis for the claims and/or as a representative basis for teaching one of ordinary skill in the art to variously employ the present invention.

Turning to the drawings, FIG. 1 depicts a perspective view of a vehicle 10 including a forward looking radar (FLR) unit 12 mounted to the vehicle 10 behind front grille 14. FIG. 2 shows the apron assembly 16 of vehicle 10 and the front bumper 18 of vehicle 10 mechanically coupled to the apron assembly 16. The location of the front bumper relative to the apron assembly may vary between assemblies because of the variation in the location of holes on the apron end for receiving bumper screws. In certain embodiments, the hole location variation can be in the range of +/−3.0 mm. Moreover, the size, i.e. diameter, the screw size can vary between assemblies, for example by +/−0.5 mm. These variations may render the surfaces of the bumper unsuitable for mounting an FLR unit without expensive and time-consuming manual alignment after the mounting operation.

In at least one embodiment, a mounting bracket is provided that decouples the FLR unit alignment angle from the bumper surface, or other surfaces susceptible to wide variations between vehicle assemblies. The mounting bracket of these embodiments can be used to adequately align the FLR unit within an acceptable angular tolerance without manual alignment.

FIG. 3 depicts a schematic, cross-sectional, side view illustration of the vertical angle tolerances of a FLR unit 100 mounted on a vehicle 102, which includes grill reinforcement opening (GOR) 104, body 106, chassis 108 and wheels 110. The vehicle 102 is positioned on a ground plane 112. Line 114 bisects the cross-sectional, side view of the FLR unit 100 and extends outwardly from the face 114 of the FLR unit 100. Line 114 is also substantially parallel to the ground plane 112, which is utilized as the reference plane for the radar beam angle calculation. As shown in FIG. 3, radar beam 116 is positioned at a preferred vertical angular alignment, i.e. radar beam 116, having a beam width of 4.4 degrees, is bisected by line 114.

In other embodiments, the FLR unit 100 can mounted to the chassis 108 and either the GOR 104 or body 106 using one or more of the vehicle mounting brackets disclosed herein.

In certain embodiments, the FLR unit can be used for its intended purposes outside of the preferred alignment position. Lines 118 and 120 depicted the upper and lower boundaries of a range of tolerable vertical alignments. In the embodiment shown in FIG. 3, the radar beam 116 can vary +2.1 degrees to −2.0 degrees relative to the preferred position while maintaining its sensing functionality for its intended purpose relating to vehicle safety systems. In other embodiments, the tolerable range can be +/−1.0 degree from the preferred position, and in yet other embodiments, the tolerable range can be +/−3.0 degrees from the preferred position. Beam 120 is outside of the tolerable range, and therefore, represents a failed alignment, which may require manual adjustment.

The vertical angular position of various vehicle components, such as the mounting bracket for FLR unit 100, the bumper 104, and the chassis 108, after assembly can add to vertical misalignment of the FLR unit. In at least one embodiment of the present invention, the FLR unit 100 is mounted to the body at a control point, which is described in more detail below, to thereby reduce the effect of such misalignment caused by vehicle component assembly.

Moving back to FIGS. 1 and 2, the apron assembly 16 and front bumper 18 are generally disposed behind front bumper fascia 20. In at least one embodiment, the FLR unit 12 is mounted to a mounting bracket 22, which is mounted to the front bumper 18 and rail 24 of the apron assembly 16.

FIG. 4 shows an exploded view of mounting bracket 22, which generally includes a bracket face 26 and a bracket arm 28. The mounting bracket can be made of a suitably strong material, such as steel or hot-rolled carbon steel. The mounting bracket can also be electronically coated to resist rusting.

The bracket face 26 has a generally rectangular perimeter forming an opening 30 for receiving a portion of the FLR unit 12. Holes 32 are positioned on bracket face 26. FLR unit 12 includes corresponding holes 34 positioned on mounting surface 36.

Screws 38 are inserted into holes 32 and holes 34 to attach the FLR unit 12 to the bracket face 26. In at least one embodiment, the screws are weld screws. It should be appreciated that screws are but one example of the type of fastener that can be utilized to fix the FLR unit to the mounting bracket. Other non-limiting examples include rivets, pins, and clips. Moreover, the use of holes and fasteners provides but one example for fixing the FLR unit to the mounting bracket. Other fixtures can be utilized, such as, welded fixtures. The screws 38 can also receive spacers 40, which are positioned proximate to the mounting surface 36. In at least one embodiment, the spacers are weld spacers. Nut 42 or other spacer can be interposed between one or more screws 38 and the bracket face 26, as shown in FIG. 4.

Mounting bracket 22 includes spaced apart upper and lower braces 42 and 44 for supporting and bracing the FLR unit 12 after assembly. The upper brace 42 is affixed to the upper edge of bracket face 26 and the lower brace 44 is affixed to the lower edge of bracket face 26 and the lower edge of bracket arm 28.

In at least one embodiment, tab 46 is connected to and extends outwardly and upwardly from the upper edge of bracket frame 24. Tab 46 includes a hole 48 formed therein. In at least one embodiment, tab 50 is connected to and is substantially perpendicular to bracket arm 28. Tab 50 includes an opening 52 formed therein. In at least one embodiment, screws 54 and 56 are inserted into hole 48 and opening 52, respectively, and holes 58 and 60 are positioned on the underside 62 of front bumper 18, as shown in FIG. 5, to attach the mounting bracket 22 to the bumper 18. In at least one embodiment, the screws are weld screws. It should be appreciated that screws are but one example of the type of fastener that can be utilized to fix the FLR unit to the front bumper.

As depicted in FIGS. 2 and 4, bracket arm 28 includes a proximate end portion 64 connected proximate to a side edge of the bracket face 24 and a distal end portion 66. A bracket arm frame portion 68 is disposed between end portions 64 and 66 for providing support and strength to bracket arm 28.

The distal end portion 66 includes a mounting portion 70, which includes first hole 72 and second hole 74. As depicted in FIG. 2, mounting surface 76 of rail 24 is oriented substantially vertically relative to the ground plane. The mounting surface 76 includes first and second holes 78 and 80 spaced apart a distance substantially equal to the spaced apart distance of first and second holes 72 and 74 of the mounting portion 70.

In at least one embodiment, the rail mounting surface 76 is a control surface and one or both of the first and second holes 78 and 80 are positioned relative to control points on the control surface. Control points refer to fixed points on the control surfaces of vehicle parts during assembly. Control points can govern the location of position-sensitive parts and systems, such as suspension members, engine mounts, and body mounts, during assembly. Uncontrolled surfaces and points can refer to those surfaces and points that are not related to governing the location of position-sensitive parts. For example, a front bumper surface can be an uncontrolled surface.

In at least one embodiment, first hole 78 is positioned substantially centered on a control point 82 located on the rail mounting surface 76. It should be appreciated that the hole does not have to be exactly centered on the control point, and in at least one embodiment, a tolerance of +/−1.0 millimeter is suitable for positioning the FLR unit. In other embodiments, the center hole position can be located within +/−2.0 millimeters from the control point. This tolerance can be any range such that the total vertical tolerance stack of the mounting elements of the mounting bracket and the control surface, taking into account the aft distance of the FLR unit face to the control point, provides a vertical angular alignment within a tolerable range. In at least one embodiment, the aft distance is 300 mm and the vertical tolerance stack is 4.5 mm. Therefore, the angular variation is 0.85 degrees, which is suitable for alignment if the angular accuracy tolerance for the FLR unit is +/−2.0 degrees.

Screw 84 is inserted into first holes 72 and 78 to fix bracket arm 28 to rail 24. After the rail 24 and the bracket arm 28 are coupled by screw 84, screw 86 is inserted into second holes 74 and 80 to reinforce the connection between the rail 24 and the bracket arm 28. In certain embodiments, the location of second hole 80 is not defined relative to a control point.

In at least one embodiment, the tabs 46 and 50 are coupled to the front bumper underside 62 as the first step in the mounting process, followed by the step of mounting the distal end mounting portion 70 to the rail 24. In certain embodiments, the tabs 46 and 50 are formed of a deformable material, such as a deformable hot rolled steel, or deformable plastic although other deformable materials are within the spirit of this invention.

Upon mounting the distal end mounting portion 70 to the rail 24, the deformable tabs bend to comply with the front bumper underside 62, thereby decoupling the alignment angle of the mounting bracket 22 from the angle of the underside surface 66. Rather, the alignment angle of the mounting bracket 22 is substantially controlled by the mounting of the bracket arm 28 relative to a control point, which imparts limited variance of the alignment angle for the mounting bracket 22 and the mounted FLR unit 12.

The control surface containing the control point as shown in FIG. 2 is substantially vertical to the ground plane of the vehicle and substantially orthogonal to the FLR unit face after assembly of the mounting bracket with the FLR unit to the vehicle. In other embodiments, the controlled mounting surface is not substantially vertical to the ground plane and/or the controlled mounting surface is not substantially orthogonal to the FLR unit face after assembly of the mounting bracket with the FLR unit to the vehicle. It should be appreciated that the control surface containing the control point can have any angular association with the ground plane and FLR unit face provided that the bracket assembly using such a control point results in a vertical angular alignment of the FLR unit face within a tolerable range. A non-limiting example of a tolerable range is a range that does not result in the need for manual alignment.

Figure 6:
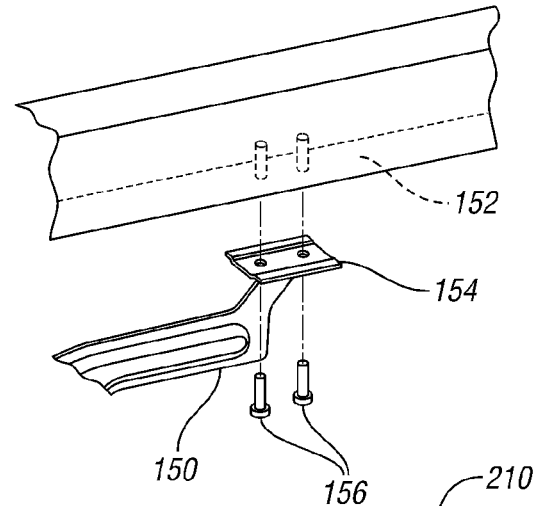
FIG. 6 is an exploded, perspective view of a bracket mounting feature according to one embodiment.

FIG. 6 depicts a schematic, perspective view of a mounting bracket 150 and controlled mounting surface 152 with an alternative geometrical orientation according to an embodiment of the present invention. Substantially horizontal mounting portion 154 is mounted to substantially horizontal controlled mounting surface 152 via screws 156.

Figure 7:
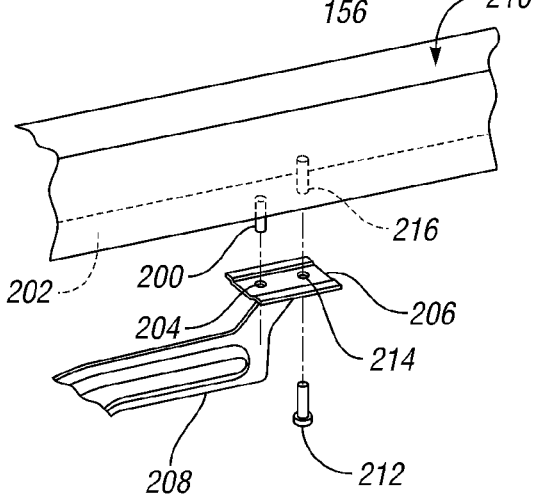
FIG. 7 is an exploded, perspective view of a bracket mounting feature according to another embodiment of the present invention.
Figure 8:
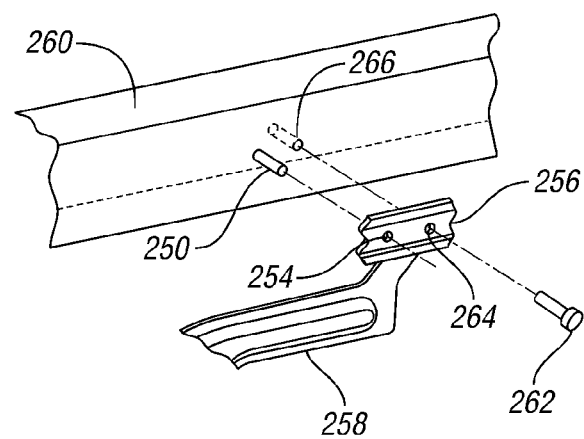
FIG. 8 is an exploded, perspective view of a bracket mounting feature according to yet another embodiment of the present invention.

As shown in FIG. 4, a screw 84 is utilized to fix the distal end mounting portion 70 to the rail 24. It should be appreciated that other mounting features can be utilized to provide this fixture. FIG. 7 depicts a stud 200 projecting orthogonally and outwardly from horizontal controlled mounting surface 202. Stud 200 is inserted into hole 204 of distal end mounting portion 206 of mounting bracket 208 to affix the distal end mounting portion 206 to the rail 210. Screw 212 can be inserted into hole 214 and hole 216 to further support the connection between rail 210 and mounting bracket 208. FIG. 8 depicts a stud 250 projecting orthogonally and outwardly from vertical controlled mounting surface 252. Stud 250 is inserted into hole 254 of distal end mounting portion 256 of mounting bracket 258 to affix the distal end mounting portion 256 to the rail 260. Screw 262 can be inserted into hole 264 and hole 266 to further support the connection between rail 260 and mounting bracket 258.

It should be appreciated that the vehicle mounting brackets of one or more embodiments of the present invention can be applied to any sensing technology, such as laser, lidar, radar, ultrasonic cameras and vision cameras.

Moreover, it should be appreciated that the vehicle mounting brackets of the present invention can be applied to any directional sensors, for example, front, side and rear-facing sensors.

Further, it should be appreciated that the vehicle mounting brackets of one or more embodiments of the present invention can be applied to headlamps. In certain embodiments, the vehicle mounting bracket can be used to automatically align headlamps without any manual alignment steps.

While the best mode for carrying out the invention has been described in detail, those familiar with the art to which this invention relates will recognize various alternative designs and embodiments for practicing the invention as defined by the following claims.

What is claimed:

1. A bracket for attaching and aligning a forward-looking radar (FLR) having a front face, the bracket being mountable to a conveyance having first and second mounting surfaces, the bracket comprising:
   a bracket frame having a bracket face and an attachment feature for attaching the FLR to the bracket frame;
   a first deformable tab extending from the bracket frame for coupling the bracket frame and the first mounting surface of the conveyance, the first deformable tab deforms between a first shape and a second shape; and
   a bracket member extending from the bracket frame, the bracket member having an end portion disposed proximate to the bracket face and a distal end portion, the distal end portion including a mounting portion for coupling the bracket member and the second mounting surface, wherein the first deformable tab complies with the first mounting surface and deforms to the second shape when the mounting portion is coupled to the second mounting surface.

2. The bracket of claim 1, wherein the first deformable tab includes a first aperture to attach the first deformable tab to the first mounting surface.

3. The bracket of claim 1, wherein the second mounting surface is a controlled mounting surface and includes a control mounting feature disposed relative to a control point on the control surface, the mounting portion of the bracket member being coupled to the control mounting feature of the second mounting surface.

4. The bracket of claim 3, further comprising a pin, wherein the controlled mounting feature is an aperture and the mounting portion includes an aperture disposed on the distal end of the bracket member, the pin being matable to the controlled mounting feature aperture and the mounting portion aperture for coupling the bracket member and the second mounting surface.

5. The bracket of claim 3, wherein the controlled mounting feature is a pin projecting substantially orthogonally from the controlled mounting surface and the mounting portion includes an aperture disposed on the distal end of the bracket member, the aperture being matable to the pin for coupling the bracket member and the second mounting surface.

6. The bracket of claim 1, wherein the bracket member further includes a second deformable tab that complying with the first mounting surface when the mounting portion is attached to the second mounting surface.

7. The bracket of claim 1 wherein the first deformable tab bends to the second shape to comply with the first mounting surface.

8. A conveyance comprising:
a first mounting surface;
a second mounting surface;
a forward-looking radar (FLR) having a front face;
a bracket mounted to the first and second mounting surfaces and for attaching and aligning the FLR, the bracket including:
a bracket frame having a bracket face and an attachment feature for attaching the FLR to the bracket frame;
a first deformable tab extending from the bracket frame for coupling the bracket frame and the first mounting surface of the conveyance, the first deformable tab deforms between a first shape and a second shape; and
a bracket member extending from the bracket frame, the bracket member having an end portion disposed proximate to the bracket face and a distal end portion, the distal end portion including a mounting portion for coupling the bracket member and the second mounting surface, wherein the deformable tab complies with the first mounting surface and deforms to the second shape when the mounting portion is attached to the second mounting surface.

9. The conveyance of claim 8, wherein the second mounting surface is a controlled mounting surface and includes a control mounting feature disposed relative to a control point on the control surface, the mounting portion of the bracket member being coupled to the control mounting feature of the second mounting surface.

10. The conveyance of claim 9, wherein the controlled mounting surface is a substantially horizontal surface.

11. The conveyance of claim 9, wherein the controlled mounting surface is a substantially vertical surface.

12. The conveyance of claim 9, further comprising a pin, wherein the controlled mounting feature is an aperture and the mounting portion includes an aperture disposed on the distal end of the bracket member, the pin being matable to the controlled mounting feature aperture and the mounting portion aperture for coupling the bracket member and the second mounting surface.

13. The conveyance of claim 9, wherein the controlled mounting feature is a pin projecting substantially orthogonally from the controlled mounting surface and the mounting portion includes an aperture disposed on the distal end of the bracket member, the aperture being matable to the pin for coupling the bracket member and the second mounting surface.

14. The conveyance of claim 9, wherein the conveyance is a vehicle having a bumper and the first mounting surface is a surface on the vehicle bumper.

15. The conveyance of claim 14, wherein the vehicle includes a rail mechanically coupled to the bumper and the controlled mounting surface is a surface on the vehicle rail.

16. The conveyance of claim 14, wherein the vehicle includes an apron mechanically coupled to the bumper and the controlled mounting surface is a surface on the vehicle apron.

17. The conveyance of claim 9 wherein the first deformable tab bends to the second shape to comply with the first mounting surface.

18. The conveyance of claim 8, wherein the first deformable tab includes a first aperture to attach the first deformable tab to the first mounting surface.

19. The conveyance of claim 8, wherein the bracket member further includes a second deformable tab complying with the first mounting surface when the mounting portion is attached to the second mounting surface.

* * * * *